Oct. 12, 1965　　　　R. T. HEADRICK　　　　3,211,446
CUTTING FIXTURE

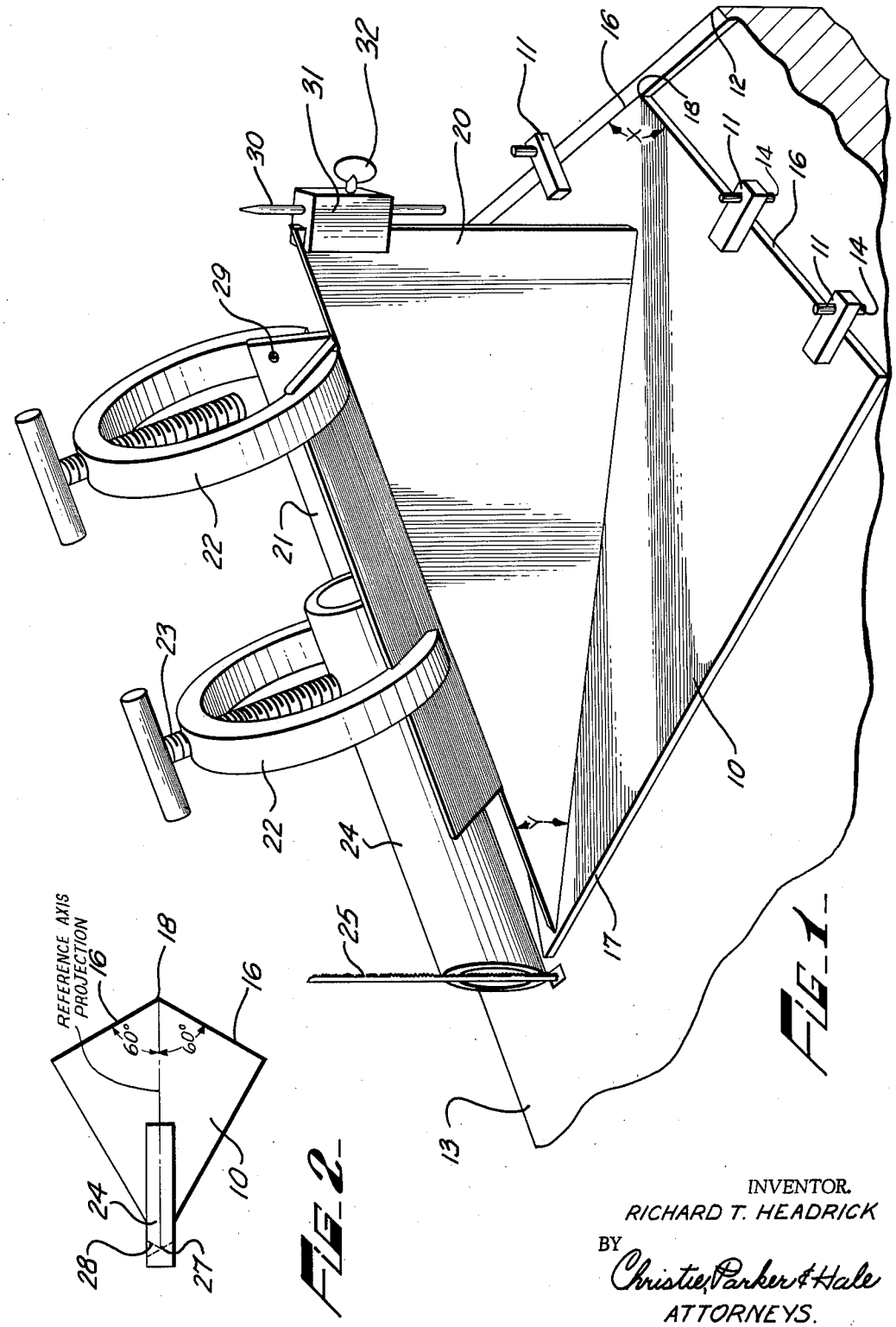

Filed April 2, 1962　　　　　　　　　　　　2 Sheets-Sheet 2

United States Patent Office 3,211,446
Patented Oct. 12, 1965

3,211,446
CUTTING FIXTURE
Richard T. Headrick, 372 N. Avenue 52,
Los Angeles 42, Calif.
Filed Apr. 2, 1962, Ser. No. 184,148
5 Claims. (Cl. 269—55)

The present invention relates to a cutting fixture, and particularly a cutting fixture for use in cutting the ends of structural or decorative members for three-way 90° mitred joints.

Many forms of construction require the joining together of structural or decorative members especially cylindrical objects such as pipe, in three-way 90° joints. The structural strength of pipe, for example, is well known, and uses requiring such a joint construction include, among others, industrial balconies, railings for marine use, and various assemblies requiring a cube or rectangular cubical framework.

Heretofore, three-way 90° joints of pipe, for example, had to be made by use of threaded joints or by welding after hand-cutting. The use of threaded joints is disadvantageous in most cases because of time-consuming and difficult assembly procedures, the weight and size of the joint assembly into which the pipe must be threaded, inability to achieve precise dimensions, instability of resultant structure, and high cost of time and materials, among other reasons. Welded joints are known to be more desirable because of elimination of the above disadvantages of threaded joints and better appearance of the resultant product.

Prior to the present invention, however, welded three-way 90° joints had to be made by a time-consuming, cumbersome and often imperfect "cut-and-try" hand-cutting operation, because of the complex geometry required to attain a perfect mitred fit. The slightest cutting error resulted in one or more of the following problems; failure to attain 90° angles, imperfect and unstable fit, or impossibility of making a fit requiring reworking the piece and waste. These problems multiplied when it was necessary that both ends of a section of pipe engage in a three-way 90° joint, as in cube framework construction. In such case an error requiring reworking the pipe at one end made useless a satisfactorily-cut opposite end, thus requiring waste or discard of the entire length of pipe.

The above disadvantages are entirely overcome by the present invention, which provides a novel apparatus for positioning a structural or decorative member, which may be referred to as a work piece, for cutting at the proper angles to fit perfectly into a three-way 90° joint.

This invention provides a cutting fixture for use with cutting machines having a guide surface and a cutting tool arranged to cut along a cutting plane, being a cutting machine such as the conventional band saw. The cutting fixture is provided with a base arranged to cooperate with the guide surface so that it may be moved along the guide surface to define a reference plane perpendicular to the cutting plane. The base carries clamping means arranged to secure a work piece along a reference axis at an angle of substantially 35° with respect to the reference plane. First and second guide means are attached to the base and arranged to cooperate with a guide strip secured to the guide surface or with other suitable means to control the direction of movement of the base along the guide surface. The first guide means define at least two points along a first guide line substantially parallel to the reference plane and positioned so that its normal projection upon the reference plane intersects the normal projection of the reference axis upon the reference plane at an acute angle of 60°. A normal projection of a given line is that line which is produced on a plane by the intersection with the plane of a second plane which includes the line to be projected, the two planes being disposed perpendicular to one another. The second guide means define at least two points along a second guide line substantially parallel to the reference plane, and positioned so that its normal projection upon the reference plane intersects the normal projection of the reference axis upon the reference plane at an acute angle of 60° and intersects the projection of the first guide line at an angle of 120°.

In operation, the work piece is secured by the clamping means in such manner that the end of the work piece to be cut extends into the cutting plane, the fixture is then passed through the cutting machine guided by the first guide means, making an angular cut on the work piece parallel to the first guide line. The fixture is then again passed through the cutting machine guided by the second guide means with the work piece remaining secured in its original position, making a second angular cut on the work piece parallel to the second guide line.

Another feature of this invention is the provision of a pointer device which makes it possible to remove a work piece after one end has been cut, and reinsert it for cutting of the opposite end. By using the pointer and rotating the work piece before clamping until a centerline reference mark on the work piece coincides with the tip of the pointer, it is possible to keep the work piece in the same plane and achieve a perfect cut at both ends.

It is found that three sections of a cylindrical object identically cut by use of the fixture in accordance with this invention will nest perfectly into a three-way 90° mitred joint. Thus, perfect three-way welded joints are attained very rapidly, and with negligible waste or opportunity for error.

The invention is described in more detail in reference to the accompanying drawings, in which:

FIG. 1 is a perspective view of the cutting fixture apparatus of the present invention;

FIG. 2 is a plan view of the base of the cutting fixture apparatus in accordance with the present invention schematically showing the resultant cutting lines upon the work piece;

Figure 3:
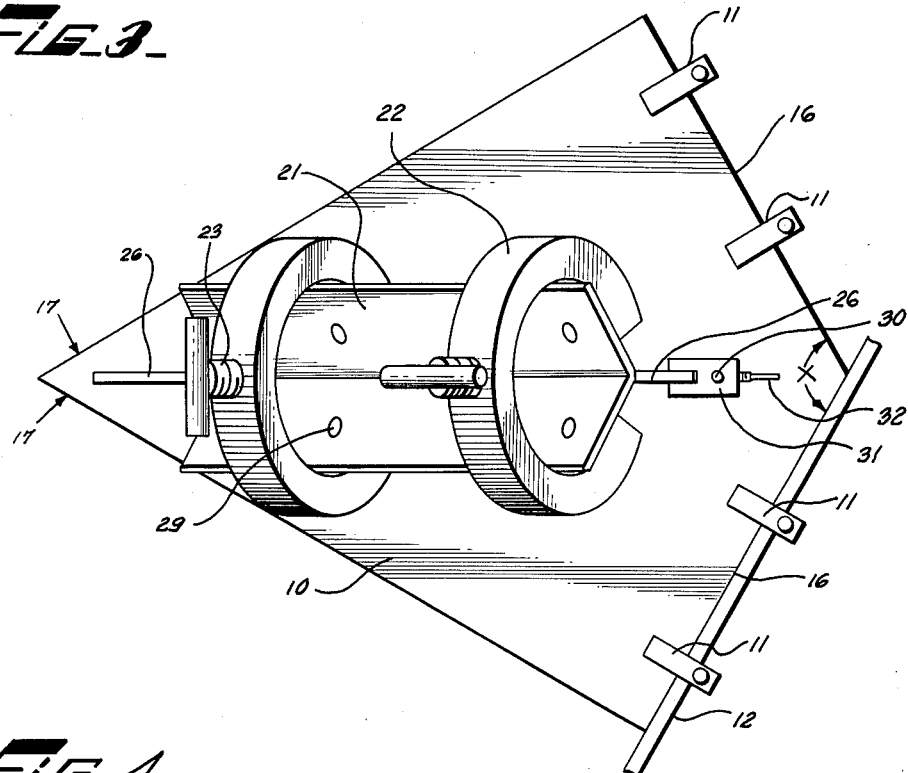
FIG. 3 is a top view of the cutting fixture in accordance with the present invention.
Figure 4:
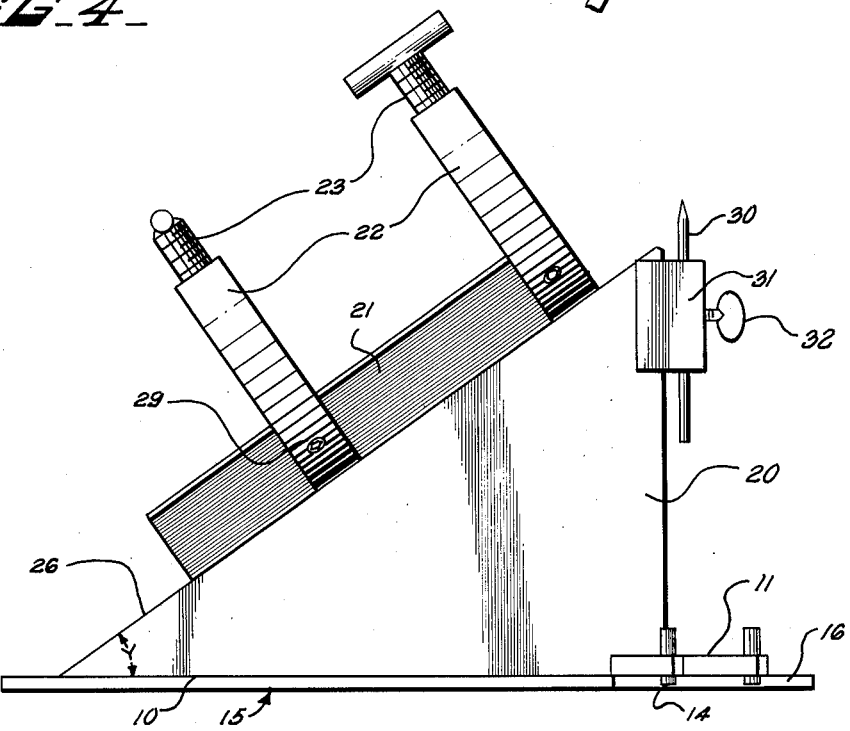
FIG. 4 is a side view of the cutting fixture apparatus of FIG. 3.

Referring now to the drawings, more particularly to FIG. 1, in the presently preferred embodiment of this invention four side guide lugs 11 are attached by welding or otherwise to the trailing end 16 of a flat horizontal plate 10 which may be referred to as the base of the fixture. The plate 10 rests upon the bed or table 13 of a band saw, which may be referred to as the guide surface thereof. In the embodiment illustrated in FIG. 1 the lower surface of the plate 10 is flat and defines a reference plane. The trailing end 16 is that portion of the plate 10 opposite the leading end 17 of the plate 10, which leading end 17 may be angular as illustrated in the drawings or may be straight or curved. The leading end 17 is that portion of the plate 10 nearest the cutting tool, represented in the drawing by the blade 25 of a band saw (not shown). The cutting tool is disposed in a cutting plane which is perpendicular to the table 13. It is not essential that the plate 10 itself be flat, as runners may be attached to the plate 10 for engaging the guide surface 13 of the cutting machine. The essential requirement is that the base be adapted to cooperate with the guide surface to define a reference plane perpendicular to the cutting plane as the base is passed along the guide surface. As shown in FIG. 1, in a preferred embodiment of the invention the base plate 10 is symmetrical in configuration about a line between the midpoints of trailing end 16 and leading end 17.

The side guide lugs 11 each contain a pin-like guide member 14 extending downwardly from the lug. Each guide member is adapted to slidingly engage a guide strip 12 which is suitably secured to the bed or table 13 of the saw in parallel alignment with the plane of saw blade 25. As shown in FIG. 1, the trailing end 16 of the base 10 consists of two straight portions which intersect at the midpoint 18 of the trailing end 16 so that, when projected normally on the reference plane, they include an angle X at the midpoint 18 which is 120°. Each straight portion of end 16 has two guide lugs 11 associated therewith. Guide members 14 are disposed in the lugs so as to be spaced from the adjacent rear edges of plate 10 a distance substantially equal to the width of guide strip 12 measured perpendicular to the plane of saw blade 25 so that the guide strip may be engaged between a straight portion of end 16 and the guide members 14 associated therewith (as shown in FIGS. 1 and 3) with the guide lugs disposed over the guide strip.

Thus the side guide lugs 11 and the guide members 14 carried by the portion of the trailing end 16 on one side of the midpoint 18 form first guide means which define two points along a first guide line parallel to the reference plane. The side guide lugs 11 and the guide members 14 carried by the portion of the trailing end 16 on the other side of the midpoint 18 form second guide means which define two points along a second guide line parallel to the reference plane and which intersects the first guide line at an angle of 120°. Any form of construction whereby the side guide lugs 11 and the guide members 14 are arranged to define points along such first and second guide lines is within the concept of the invention. It should be noted that the first and second guide lines intersect the cutting plane at angles of 30° when the normal projection of the reference axis, i.e., the line along which the pipe is to be cut is aligned, on the reference plane is positioned perpendicular to the cutting plane.

Thus, when the two side guide lugs 11 and the guide members 14 attached thereto on one side of the midpoint 18 are engaged with the guide strip 12, and the apparatus is slidingly passed along the guide strip so that a work piece 24 is passed through the cutting tool 25, a cut 27, referring now to FIG. 2, will be made in the work piece 24 along a line parallel to the first guide line, that is, the portion of the trailing end 16 whose side guide lugs 11 are engaged with the guide strip 12. The apparatus is then lifted and turned, or reversed relative to the guide strip, so that the remaining side guide lugs 11 and guide members 14 comprising the second guide means, engage the guide strip 12. The work piece is again passed through the cutting tool 25, making a second cut 28 in the work piece 24 parallel to the second guide line, that is, the portion of the trailing end 16 whose guide lugs 11 are then disposed over the guide strip 12.

The work piece 24, illustrated as a piece of pipe, is held in this preferred form of embodiment of the invention in a V-shaped channel 21 attached by welding or any suitable manner to the top edge 26 of a vertical plate 20, which in turn is welded or otherwise attached in any suitable manner to the horizontal flat plate 10. The work piece 24 is held in the V-shaped channel 21 by adjustable clamps, which may be of any suitable form to accommodate varying diameters of work pieces, such as a ring 22 bolted at 29 to the channel 21 and containing a threaded rotating member 23 so threaded that it will be raised and lowered by turning. The combination of vertical plate 20, channel 21, ring 22, and bolts 29 may be referred to as clamping means.

Top edge 26 of the vertical plate 20 is inclined upwardly toward the trailing end 16 at an angle of inclination of 35° to the base horizontal plate 10. In the preferred form of embodiment of this invention the top edge 26 continues downwardly toward the leading end 17 until it touches the horizontal plate 10 forming an angle "y" of 35°. The top edge 26 of the vertical plate 20 lies directly along a line which bisects the 120° included angle "X" at the midpoint 18 of the trailing end 16. Accordingly, a normal projection of the reference axis on the reference plane bisects the included angle between the normal projections of the first and second guide lines on the reference plane.

In the preferred form the clamping means are so adapted that the work piece 24 remains parallel to the top edge 26 of vertical plate 20 so that the longitudinal axis of the work piece 24, which may be referred to as a reference axis, is inclined at an angle of 35° to the base plate 10. In the preferred form, base plate 10 and table 13 lie on parallel planes, so that the reference axis along which the work piece 24 is secured is also inclined at an angle of 35° to the reference plane, which is coincident with the plane of the top surface of the table 13. It will be understood that any combination of parts of the fixture resulting in the work piece 24 being held along a reference axis inclined at an angle of 35° to the reference plane is within the concept of this invention.

A pointer 30 is provided for use when it is desired to cut both ends of the work piece 24 in order to maintain the same plane and ensure proper fitting at both ends. One side of the work piece may be dyed, and by use of a scribe and table guide a centerline may be marked the full length of the piece in the dye. The piece 24 is then placed in the apparatus in such position that the marked center line coincides with the tip of the pointer 30. After one end of the work piece 24 has been completely cut, the piece is removed, its direction reversed, and re-inserted in the apparatus in such a position that the center line again coincides with the tip of the pointer 30. The pointer 30 is held by any suitable bracket 31, which may be welded or otherwise attached to the vertical plate 20. The bracket 31 contains any suitable threaded screwing device 32 to tighten and loosen the pointer 30 in the bracket 31, so that as varying diameters or thicknesses of work pieces 24 are placed in the channel 21, thus raising and lowering the position of the bottom portion of the work piece 24, the pointer 30 may be raised or lowered a corresponding distance so as to be able to make contact with the reference mark on the work piece 24. The pointer bracket 31 is so positioned that the pointer 30 extends upwardly in an area beyond the end of the channel 21.

Various modifications of the cutting fixture apparatus will be apparent to those skilled in the art. The listing of examples herein is not intended to exclude variations apparent to one skilled in the art but not so listed herein.

There has thus been disclosed a cutting fixture which is highly efficient, inexpensive to manufacture, and an effective solution to the many difficulties formerly encountered in cutting the ends of cylindrical objects for fitting together into three-way 90° mitred joints.

I claim:

1. A fixture for positioning a member for cutting of the member to fit together with other similarly cut members into a three-way 90° mitered joint, said fixture comprising
    (a) a base defining a reference plane,
    (b) first guide means on the base for defining at least two guide points disposed along a first guide line, the first guide line being disposed substantially parallel to the reference plane,
    (c) second guide means on the base for defining at least two guide points disposed along a second guide line, the second guide line being disposed substantially parallel to the reference plane and intersecting the first guide line at an included angle of 120°,
    (d) clamping means carried by the base for releasably securing the member to the base, said clamping means defining a reference axis disposed at an angle of substantially 35° relative to the reference plane and along which the member is aligned when secured to the base, a normal projection of the reference axis on the reference plane intersecting normal projections of each of the first and second guide lines on the reference plane at an angle of 60°.

2. A fixture for positioning a member for cutting of the member to fit together with other similarly cut members into a three-way 90° mitered joint, said fixture comprising
   (a) a base defining a reference plane,
   (b) first guide means on the base for defining at least two guide points disposed along a first guide line, the first guide line being disposed substantially parallel to the reference plane,
   (c) second guide means on the base for defining at least two guide points disposed along a second guide line, the second guide line being disposed substantially parallel to the reference plane and intersecting the first guide line at an included angle of 120°,
   (d) clamping means carried by the base for releasably securing the member to the base, said clamping means defining a reference axis disposed at an angle of substantially 35° relative to the reference plane and along which the member is aligned when secured to the base, a normal projection of the reference axis on the reference plane intersecting normal projections of each of the first and second guide lines on the reference plane at an angle of 60°, the reference axis intersecting the projection thereof at a location spaced from each of the guide lines.

3. A fixture for cutting an elongated tubular member in a preselected manner to fit together with other similarly cut members into a three-way 90° mitered joint, said fixture comprising
   (a) a base defining a reference plane,
   (b) clamping means carried by the base for releasably securing the member to the base, said clamping means defining a fixed reference axis disposed at an angle of substantially 35° relative to the reference plane, said clamping means securing the member relative to the base in alignment with the reference axis,
   (c) first guide means on the base for defining at least two guide points disposed along a first guide line, the first guide line being disposed substantially parallel to the reference plane and a normal projection thereof on the reference plane intersecting a normal projection of the reference axis on the reference plane at an angle of 60°,
   (d) second guide means on the base for defining at least two guide points disposed along a second guide line, the second guide line being disposed substantially parallel to the reference plane and a normal projection thereof on the reference plane intersecting the reference axis normal projection at an angle of 60° and intersecting a normal projection of the first guide line on the reference plane at an angle of 120°, and
   (e) an adjustable pointer carried by the clamping means for engaging reference marks on the member to dispose the member in a selected position in the clamping means.

4. A fixture for cutting a member in a preselected manner to fit together with other similarly cut members into a three-way 90° mitered joint, said fixture comprising
   (a) a base defining a reference plane,
   (b) clamping means carried by the base for releasably securing the member to the base, said clamping means defining a fixed reference axis disposed at an angle of substantially 35° relative to the reference plane, said clamping means securing the member relative to the base in alignment with the reference axis,
   (c) first guide means on the base for defining at least two guide points disposed along a first guide line, the first guide line being fixed relative to the base and disposed substantially parallel to the reference plane and a normal projection thereof on the reference plane intersecting a normal projection of the reference axis of the reference plane at an angle of 60°,
   (d) second guide means on the base for defining at least two guide points disposed along a second guide line, the second guide line being fixed relative to the base and disposed substantially parallel to the reference plane and a normal projection thereof on the reference plane intersecting the reference axis normal projection at an angle of 60° and intersecting the first guide line at an angle of 120° where the first guide line intersects said normal projection of the reference axis.

5. A fixture for cutting an elongated structural or decorative member in a preselected manner to fit together with a pair of similarly cut members into a three-way 90° mitered joint, the fixture comprising
   (a) a unitary planar base shaped symmetrically about a line of symmetry through the base in the plane thereof,
      (i) the base having a first pair of edges intersecting each other at an included angle of 120°,
      (ii) the line of symmetry bisecting said 120° angle,
   (b) a plate secured to the base along the line of symmetry of the base and disposed perpendicular to the plane of the base,
      (i) the plate having an upper edge defining a reference axis of the fixture,
      (ii) the plate upper edge being inclined at an angle of substantially 35° to the plane of the base and intersecting the base line of symmetry at a location on said line spaced from the intersection of said first pair of edges, and
   (c) means secured to the plate for clamping said member to the fixture in parallel alignment with said reference axis.

References Cited by the Examiner

UNITED STATES PATENTS

| | | | |
|---|---|---|---|
| 1,015,336 | 1/12 | Orlandi | 269—87 XR |
| 2,508,514 | 5/50 | Legge | 269—87 XR |
| 2,568,952 | 9/51 | Daily | 269—87 XR |
| 2,746,125 | 5/56 | Cuny | 83—581 XR |
| 2,848,785 | 8/58 | Bachli et al. | 269—87.2 |

ROBERT C. RIORDON, *Primary Examiner.*

THOMAS J. HICKEY, *Examiner.*